June 23, 1936. A. GUERRIERO 2,044,845
PISTON RING AND SPRING
Filed Sept. 18, 1934
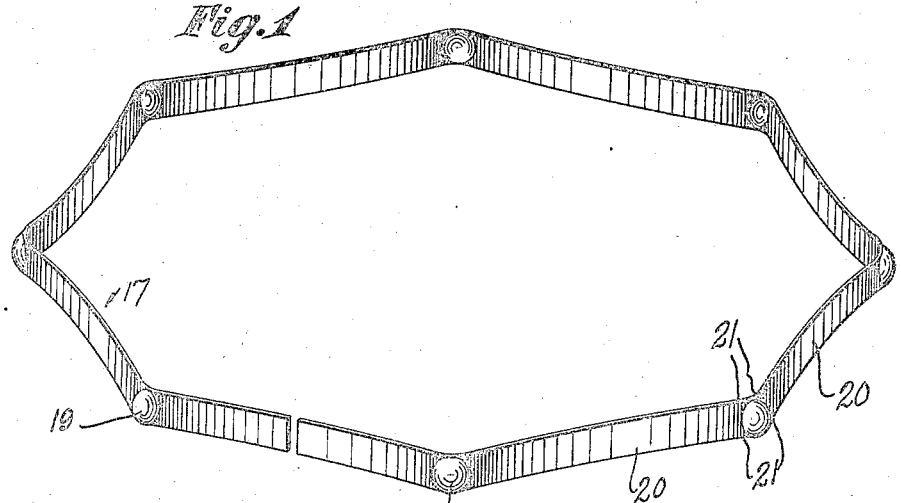
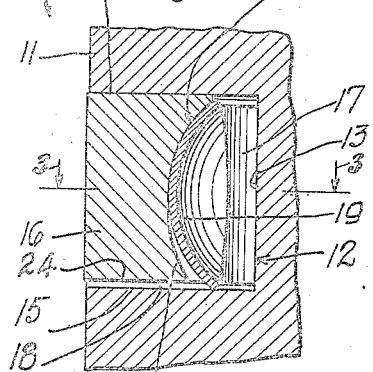
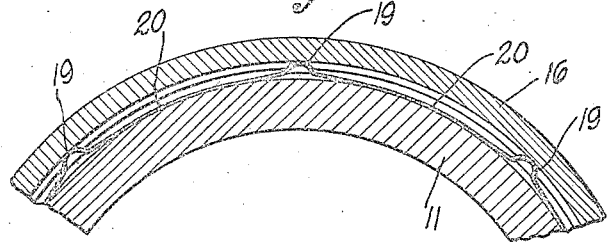
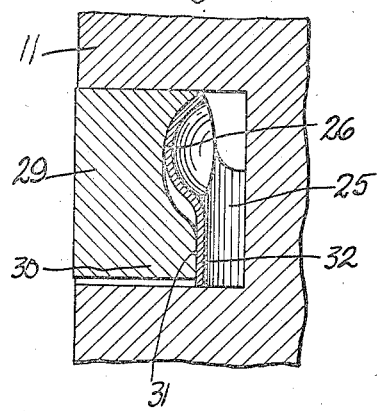
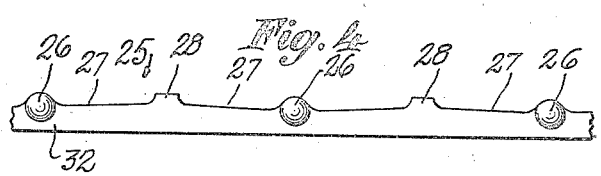
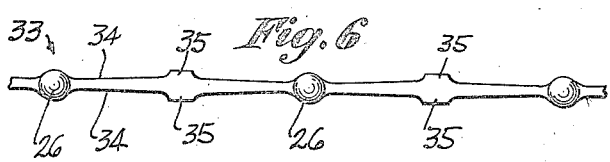
INVENTOR:
Anthony Guerriero
BY
ATTORNEY Patented June 23, 1936

2,044,845

UNITED STATES PATENT OFFICE 2,044,845

PISTON RING AND SPRING

Anthony Guerriero, Brooklyn, N. Y.

Application September 18, 1934, Serial No. 744,499

3 Claims. (Cl. 309—27)

This invention relates to piston rings and springs therefor.

One object of the invention is to provide a device of the character described having improved spring means for maintaining an efficient and continuous actuation of a piston ring in an outward radial and in an axial direction, the spring means consisting of one piece of metal of relatively uniform structure so as to be strong and free of breakage under conditions of shock and the like which obtain in high speed internal combustion motors.

Another object of the invention is the provision of an improved coordination of piston ring and spring embodied in a unit which shall be cheap to manufacture and assemble, and having few and simple parts, and durable, reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is an isometric view showing a spring embodying the invention.

Fig. 2 is an enlarged fragmentary vertical sectional view of an assembled device embodying the invention.

Fig. 3 is a horizontal sectional view taken on the line 3—3 of Fig. 2, on a reduced scale.

Fig. 4 is a fragmentary view in side elevation of a modified spring in flat position, before being shaped into the polygonal form.

Fig. 5 is a view similar to Fig. 2, showing an embodiment including the modified spring.

Fig. 6 is a view similar to Fig. 4 showing a further modification of the spring.

The advantages of the invention as here outlined are best realized when all of its features and instrumentalities are combined in one and the same structure, but, useful devices may be produced embodying less than the whole.

Referring in detail to the drawing, 10 denotes a device embodying the invention. The same may include a piston 11 having a conventional annular groove 12 having an inner cylindrical face 13 and upper and lower plane, parallel faces 14, 15 respectively. Disposed within this groove is a circular piston ring 16, which is conventional except as hereinafter described. Between the ring 16 and the wall 13 is disposed a spring 17 which is arranged and constructed to bear radially outward on the ring 16 and to actuate the latter upward into snug contact with the surface 14. As a result of this actuation, a clearance 18 occurs between the ring and the lower groove face 15.

To appreciate the problem involved in the provision of a piston ring spring that shall function as described, it must be borne in mind that very little space is available for receiving the spring and permitting its movements. The spring is ordinarily either $\frac{1}{8}$ inch, or $\frac{3}{32}$ inch or $\frac{1}{16}$ inch in overall width. Likewise, since the depth of the groove is small, and the piston ring must have ample thickness for strength, it becomes a problem to insert the now circular spring into the groove under sufficiently high tension to actuate the ring. At the same time, the coordination in arrangement must be such that the spring will not bite into the ring, but sufficient freedom of action must be available for the required relative movements between the ring and spring.

Under the foregoing circumstances, I have devised the polygonal spring 17 having its apical portions outwardly radially formed to provide ball or spherical segments 19. The spring 17 may be in the nature of a one piece thin strip spring, the side portions 20 intermediate the apices thereof being relatively flat or plane, but desirably slightly inwardly concaved for a purpose hereinafter described. These sides may be uniformly equal in width with the bases of the ball segments 19; in other words, the latter may extend from edge to edge of the spring. Since the ball or bearing segments 19 are pressed out of the spring, the full width of the spring is thus utilized to permit the ball segments to project to a suitable degree beyond the geometric apices of the spring, for example, $\frac{1}{32}$ to 3/64 of an inch, and yet without causing undue thinning down and weakening of the spring.

The degree of projection of the ball segments is sufficient to prevent the adjacent edges of the spring as at points 21 closely contiguous to the ball segments from biting into or wearing shoulders into the piston ring.

Heretofore it has been known to provide piston ring springs having resilient tongue constructions for bearing on the rings. Due to the small size of the spring and hence of the tongues, the latter usually break under stress and vibration.

Then again, it has been known to provide plain polygonal springs, which would necessarily wear shoulders in the ring due to the constant bearing on the ring of the spring edges at the apices of the spring. It will be appreciated that a mere flattening of the apices or concaving thereof would not suffice, but that distinct projections must be provided, preferably of cam or ball shape for uniform actuation of the ring by maintaining a constant slide engagement therewith.

To this end, the ring 16 is formed at its inner face with an annular cam surface 22, which is of transversely arcuate form arranged so that the segments 19 are adapted to bear radially outward and upward thereon. The transverse curvature of the cam face is greater than that of the segments 19 to permit relative axial movement between the ring and spring. For example, a clearance space is observed at 23, and while the ring surface thereat may be vertical, it is desirably curved as shown to afford a maximum base 24 for the ring.

In use the spring 17 rests on the groove face 15 and moves the ring 16 upward as shown, the top edge of the spring being maintained slightly spaced from the groove face 14 by the ring cam 22. The spring sections 20 may snugly hug the groove wall 13 as shown in Fig. 3.

In Figs. 4 and 5 is shown a device according to a modification of the invention. The polygonal spring 25 is similar to the spring 17, except that it has ball segments 26 spaced from the lower edge thereof, the upper edge being intermediately cut away at 27 except at the points 28. The ring 29 is similar to the ring 16, except that its lower section 30 is greater and provides an inner cylindrical face 31 against which bears the corresponding lower portion 32 of the spring 25. By this arrangement a powerful radial stress on the ring is assured, the latter being suitably balanced by the spring. The undercuts at 27 prevent any biting of the spring into the ring. The projections 28 that lie in the planes of the spring sides serve to stabilize the spring and assure that the upper portion of the ring cannot tilt inward with respect to the groove.

In Fig. 6 is shown another modification of the invention including a polygonal spring 33 which is similar to the springs 17 and 25, except that its undercuts 34 and intermediate projections 35 are duplicated for the upper and lower edges of the spring. This spring is ideal in an assembly such as shown in Fig. 2, and is continuous and relatively uniform throughout. It can be cheaply manufactured, conveniently assembled for use, and is durable and reliable in operation. The springs 17 and 33 can be used for single and longitudinally split piston rings.

I claim:

1. A device including a piston ring having a part of its inner annular face of arcuate form in cross section, and a substantially polygonal one piece strip spring having apical corner portions constituting spheroidal segments projecting outward in the plane of the spring, said segments lying substantially between the edges of the spring and being confined to and constituting solely the apical portions of the spring, said segments bearing against said annular face of the ring so as to exert an upward and radial outward force on the ring, and the ring and spring being adapted for relative axial movement to each other, the sides of said polygonal spring being normally outwardly concaved and otherwise relatively flat, and being reduced in width immediately adjacent to opposite sides of each spheroidal segment to prevent cutting of the ring by the spring.

2. A device including a piston ring having a part of its inner annular face of concave form in cross section, and a one piece substantially polygonal strip spring for the ring having outward projecting spheroidal segments at the apices thereof, the chord of maximum width of each segment being substantially equal to the maximum width of the spring, said segments bearing against said annular face so as to exert an upward and radial outward force on the ring, and the ring and spring being adapted for relative axial movement to each other, the portions of the axial movement to each other, the portions of the spring intermediate of the segments being of reduced width beginning at points immediately at opposite sides of the spheroidal segments and said portions having edge projections intermediate of the ball segments, adapted to bear against walls of a piston groove radially and in the axial direction of the ring, to prevent an axial movement of the spring and resist torsional stresses thereon.

3. A device including a piston ring having a part of its inner annular face of concave form in cross section, and a substantially polygonal one piece strip spring having apical corner portions constituting spheroidal segments projecting outward in the plane of the spring, said segments being confined to and constituting solely the apical portions of the spring, said segments bearing against said annular face of the ring so as to exert an upward and radial outward force on the ring, and the ring and spring being adapted for relative axial movement to each other, the sides of said polygonal spring being reduced in width immediately adjacent to opposite sides of each spheroidal segment to prevent cutting of the ring by the spring.

ANTHONY GUERRIERO.